US008438517B2

(12) United States Patent
Appleton et al.

(10) Patent No.: US 8,438,517 B2
(45) Date of Patent: May 7, 2013

(54) SYSTEM AND METHOD FOR AUTOMATICALLY MANAGING CLOCK RELATIONSHIPS IN INTEGRATED CIRCUIT DESIGNS

(75) Inventors: Samuel S. Appleton, Burlingame, CA (US); Atul Bhagat, San Jose, CA (US); Timothy P. Moore, Mountain View, CA (US)

(73) Assignee: Ausdia, Inc., Sunnyvale, CA (US)

( * ) Notice: Subject to any disclaimer, the term of this patent is extended or adjusted under 35 U.S.C. 154(b) by 0 days.

(21) Appl. No.: 13/324,880

(22) Filed: Dec. 13, 2011

(65) Prior Publication Data
US 2012/0151425 A1 Jun. 14, 2012

Related U.S. Application Data

(60) Provisional application No. 61/422,626, filed on Dec. 13, 2010.

(51) Int. Cl.
 *G06F 9/455* (2006.01)
 *G06F 17/50* (2006.01)
(52) U.S. Cl.
 USPC .............. 716/113; 716/108; 716/134
(58) Field of Classification Search .................. 716/113, 716/132, 134, 108
 See application file for complete search history.

(56) References Cited

U.S. PATENT DOCUMENTS

| 6,247,137 B1* | 6/2001 | Wickeraad ............ 713/401 |
| 2005/0131670 A1* | 6/2005 | Wang et al. ............ 703/23 |
| 2011/0066873 A1* | 3/2011 | Manohar et al. ......... 713/400 |

* cited by examiner

*Primary Examiner* — Thuan Do
*Assistant Examiner* — Brian Ngo
(74) *Attorney, Agent, or Firm* — Gard & Kaslow LLP

(57) ABSTRACT

Systems and methods for identifying and managing the relationships between clock domains in an integrated circuit design are disclosed. A computer-implemented method analyzes the behavioral structure of the clock-to-clock logical relationships in a proposed integrated circuit design. In one embodiment, the method comprises receiving as inputs a description of the design (in a synthesizable format or a synthesized gate-level netlist and definitions of the clock waveforms and timing constraints used in the design, and automatically identifying the relationships between the clocks specified in the description and categorizing the relationships into a plurality of behavioral categories. A list of timing exceptions may optionally also be provided as an input. The identified relationships between clocks and the behavioral categories may be used to verify any existing timing exceptions between clock pairs, and/or to create any missing exceptions between the clock pairs.

20 Claims, 12 Drawing Sheets

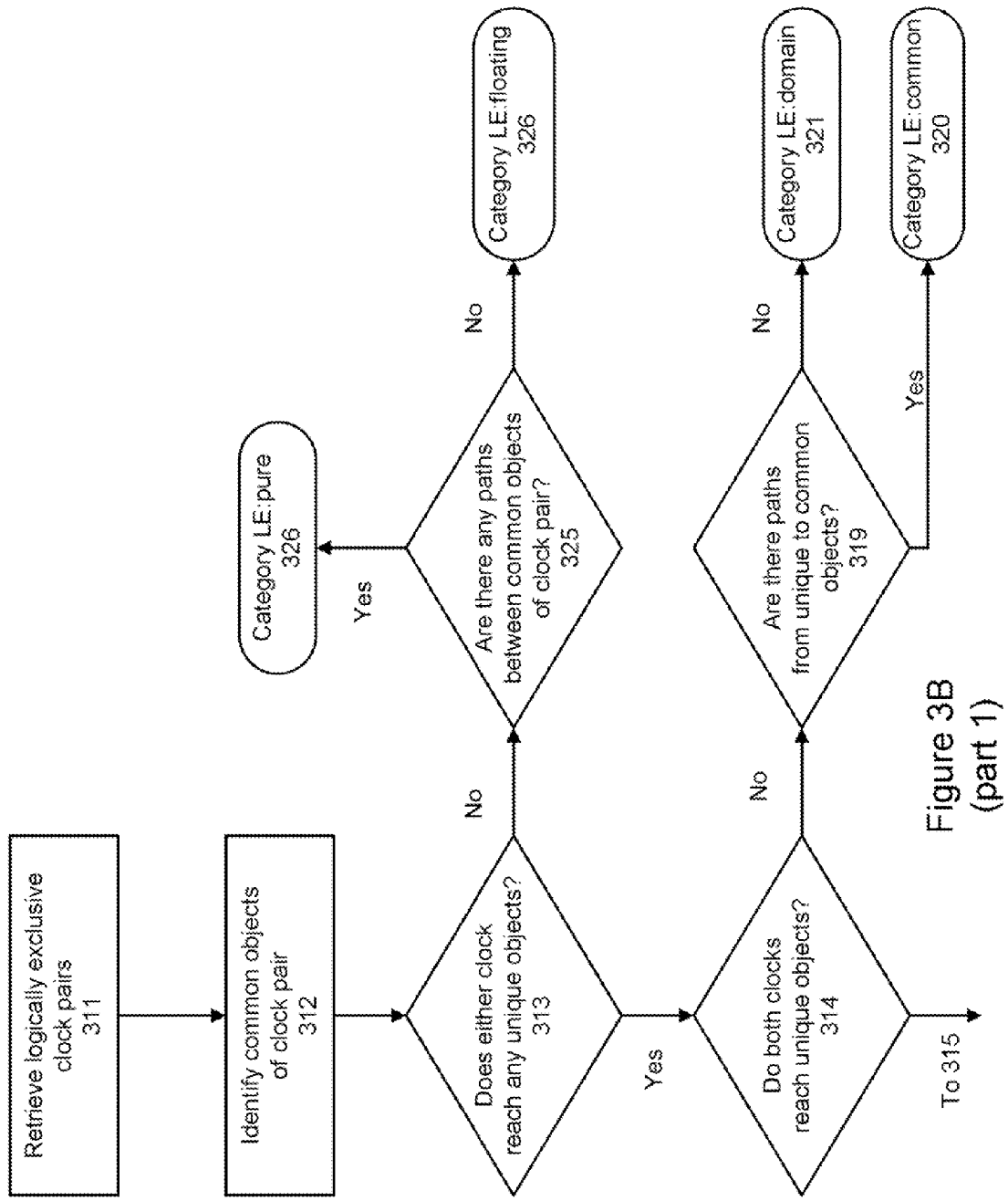
Figure 3B (part 1)

(part 2)

SYSTEM AND METHOD FOR AUTOMATICALLY MANAGING CLOCK RELATIONSHIPS IN INTEGRATED CIRCUIT DESIGNS

This application claims priority from Provisional Application No. 61/422,626, filed Dec. 13, 2010, which is incorporated by reference in its entirety.

FIELD OF THE INVENTION

The present invention relates generally to the design of integrated circuits. More specifically, the invention relates to managing the relationships between clocks during the design of integrated circuits.

BACKGROUND OF THE INVENTION

Integrated circuits are composed of transistors that comprise various elements, such as flip-flops, ports, and other elements. The transfer of data between these elements must be controlled in order for the integrated circuit to operate in a logical fashion. Clocks are used in an integrated circuit design to provide switching waveforms that control the transfer of data between elements; the elements reached by the timing signal from a particular clock are known as the "clock domain" of that clock. As integrated circuits have gotten more complex, the number of clocks that may be used in a single device has grown dramatically. Some devices may have thousands of clocks.

In many, if not most, design processes, clocks are divided into groups as a quick and convenient way to specify whether clocks are related. In some cases, each clock in a design is compared to each other clock in the design; any two clocks comprise a "clock pair." Clocks can be either "synchronous," meaning that the maximum data transfer delay between elements controlled by the two clocks must be met according to their waveform definition, or "asynchronous," meaning that the clocks are unrelated and thus that the maximum delay between elements controlled by the two clocks does not have any particular maximum delay relationship. Determining when a signal crosses from one clock domain to another is known as a "clock domain crossing" (CDC) analysis.

For synchronous clocks, this ensures that data transmitted by an element that receives a signal from one clock can reliably be received by an element that receives a signal from another related clock. However, if every clock in a design is treated as synchronous, meeting the timing constraints imposed by the various clock specifications will likely be difficult or impossible in most circuits. Since certain electronic design automation (EDA) tools, such as Static Timing Analysis (STA) tools and Physical implementation (PI) tools, will, by default, treat every clock in the design as synchronous unless it is indicated otherwise, defining asynchronous clocks that need not meet such timing constraints is critical.

In addition, it is important to identify clocks that are "physically exclusive," i.e., that cannot be physically present in the device at the same time. For example, multiple clocks should not be defined on the same clock pin. By contrast, clocks may be "logically exclusive," where they may physically exist in a circuit at the same time but are not actively used at the same time, for example, if they are multiplexed. However, logically exclusive clocks may still influence each other through crosstalk effects and thus should be considered.

For these reasons, designers typically specify both the timing constraints and any exceptions to synchronous behavior between clocks that they know to be asynchronous. This is often done with a "timing constraint file" which contains definitions of the clock waveforms, as well as any timing exceptions between clock domains and other circuit elements, any "false paths" for which timing need not be considered, and other specifications as necessary or desired.

Previous methods for managing clocks are often adhoc and manually driven, or require the designer to explicitly declare clocks as either asynchronous or synchronous before verifying the exceptions between them. Typically, the designer would insert a number of clock-to-clock timing exceptions (limited by their current understanding), and then find others randomly by an iterative process of using Static Timing Analysis tools to flag violations between asynchronous clocks, and using manual review of thousands to millions of lines of timing specification files to ensure that timing exceptions have not been erroneously inserted between synchronous clock domains.

Other known methods in this field require that any clock transfers determined to be asynchronous should be properly "synchronized" using back-to-back flip-flops. Yet other prior art methods note the necessity of not creating or missing exceptions between asynchronous and synchronous clock pairs, but do little to define how this determination should actually be made.

Modern integrated circuit design can involve hundreds, if not thousands, of independent clocks used to control the design. This number of clocks implies tens of thousands to millions of potential or actual interactions that need to be studied by designers in order to ensure reliable operation of the circuit. In many cases, timing constraints are in flux for much of the design process. Timing exceptions are commonly entered only in response to timing problems, many of which only become noticeable during the place and route portion of the design process. Thus, the CDC analysis often results in extra timing closure iterations, and is not completed and verified until very late in the design process. This may result in delays in finalizing the circuit design as mistakes in the design are repeatedly located and corrected in a time consuming, iterative process.

Thus, it would be useful to identify any timing exceptions between asynchronous and synchronous clocks as early in the implementation schedule as possible in order to ensure proper timing performance of the integrated circuit during the design phase.

SUMMARY OF THE INVENTION

Methods for the identification and management of the relationships between clock domains in an integrated circuit design are disclosed.

In one embodiment, a computer-implemented method for identifying and managing the relationships between clock domains in an integrated circuit design is disclosed, comprising: receiving at a computer system as inputs a description of the design, and definitions of clock waveforms and timing constraints used in the design; and in the computer system, automatically identifying pairs of clocks from the timing constraints and, for each identified pair of clocks: in the computer system, categorizing each clock in the pair as a source clock, a generated clock, or a virtual clock and, if the clock is a generated clock, its parent clock; in the computer system, identifying any points in the design at which the clocks the pair of clocks are applied simultaneously; in the computer system, identifying any points in the design at which the clocks in the pair of clocks logically merge; in the computer system, if the clocks in the pair of clocks are both source clocks, determining the default relationship between the clocks; in the computer system, if either clock in the pair of clocks is a generated clock, determining the relationship between the generated clock and the source clock from which the generated clock is derived; in the computer system, if either clock in the pair of clocks is a generated clock, determining whether the generated clock inherits any relationship from its parent clock; and in the computer system, assigning the clock pair to one of a plurality of behavioral categories based upon one of the determined relationships.

In another embodiment, a system for identifying and managing the relationships between clock domains in an integrated circuit design is disclosed, comprising: input means receiving a description of the design, and definitions of all clock waveforms and timing constraints used in the design; and a processor configured to automatically identify pairs of clocks from the timing constraints; and, for each identified pair of clocks: categorize each clock in the pair as a source clock, a generated clock, or a virtual clock and, if the clock is a generated clock, its parent clock; identify any points in the design at which the clocks the pair of clocks are applied simultaneously; identify any points in the design at which the clocks in the pair of clocks logically merge; if the clocks in the pair of clocks are both source clocks, determine the default relationship between the clocks; if either clock in the pair of clocks is a generated clock, determine the relationship between the generated clock and the source clock from which the generated clock is derived; if either clock in the pair of clocks is a generated clock, determine whether the generated clock inherits any relationship from its parent clock; and assign the clock pair to one of a plurality of behavioral categories based upon one of the determined relationships Still another embodiment discloses a non-transitory computer-readable medium having embodied thereon a program, the program being executable by a processor to perform a method of identifying and managing the relationships between clock domains in an integrated circuit design, the method comprising the steps of: receiving at a computer system as inputs a description of the design, and definitions of clock waveforms and timing constraints used in the design; and in the computer system, automatically identifying pairs of clocks from the timing constraints and, for each identified pair of clocks: in the computer system, categorizing each clock in the pair as a source clock, a generated clock, or a virtual clock and, if the clock is a generated clock, its parent clock; in the computer system, identifying any points in the design at which the clocks the pair of clocks are applied simultaneously; in the computer system, identifying any points in the design at which the clocks in the pair of clocks logically merge; in the computer system, if the clocks in the pair of clocks are both source clocks, determining the default relationship between the clocks; in the computer system, if either clock in the pair of clocks is a generated clock, determining the relationship between the generated clock and the source clock from which the generated clock is derived; in the computer system, if either clock in the pair of clocks is a generated clock, determining whether the generated clock inherits any relationship from its parent clock; and in the computer system, assigning the clock pair to one of a plurality of behavioral categories based upon one of the determined relationships.

DETAILED DESCRIPTION OF THE INVENTION

The present application describes methods for the identification and management of the relationships between clock domains in an integrated circuit design. A computer-implemented method analyzes the behavioral structure of the clock-to-clock logical relationships in a proposed integrated circuit design to locate, verify, and, if necessary, create timing exceptions in the design. The identified relationships may also be used to generate reports so that a designer may consider other changes to the design that may be necessary or appropriate for proper timing performance.

In one embodiment, the method receives as inputs a description of the design (e.g., in either a synthesizable format or a synthesized gate-level netlist) and definitions of all clock waveforms and timing constraints used in the design, and automatically identifies the relationships between the clocks specified in the description and categorizes the relationships into a plurality of behavioral categories. A list of timing exceptions may optionally also be provided as an input. The identified relationships between clocks may be used to verify any existing timing exceptions between clock pairs, and to identify and/or create any missing exceptions between the clock pairs. It is believed that such an automated method of treating clock relationships has not previously been suggested or attempted in the prior art.

Figure 1A:
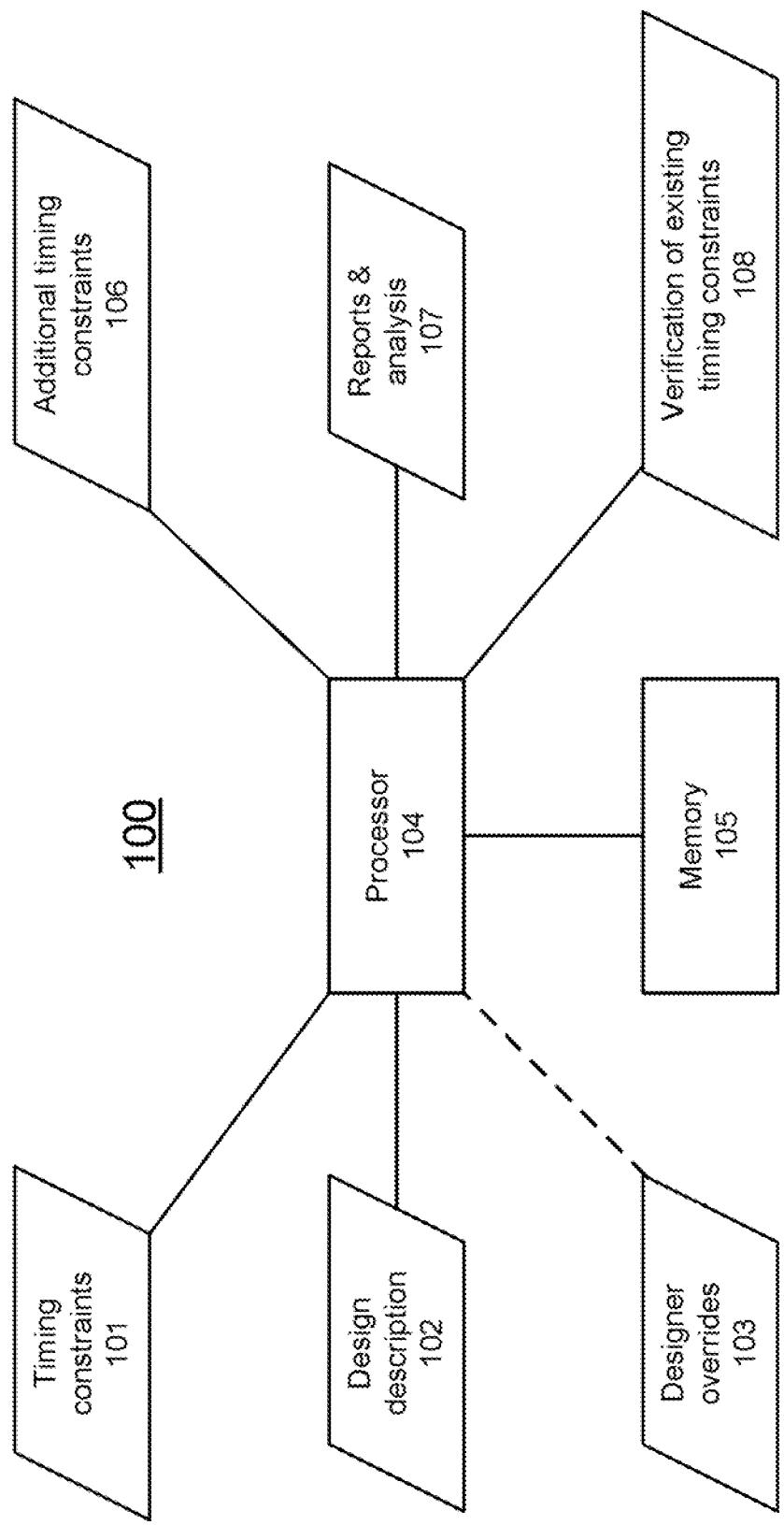
FIG. 1A is a simplified block diagram of an embodiment of a system for performing a clock management method as described herein.

FIG. 1A shows a simplified block diagram of one embodiment of a computing system 100 for performing a clock management method as described herein. Several pieces of data are received as inputs. One input is a timing constraint specification 101, for example, in SDC format, a format that defines timing constraints for commercially-available static timing analysis engines. A design description 102 is also input, typically either in gate-level netlist (synthesized) format, or in RTL-level description. Designer overrides 103 may also be optionally included as an input.

A processor 104 performs an interclock behavioral analysis on each pair of clocks, as further explained herein, resulting in a clock pair relationship database stored in memory 105. The clock pair relationship database defines clock pairs as belonging to one of a number of different "categories." These categories, and the information that led to their creation, can be reported and analyzed by designers to understand how the clocks in their design interact, and what timing problems may still exist.

In addition, the data in clock pair relationship database 105 may be used for several additional purposes. Processor 104 may provide outputs such as additional timing constraints 106 or other reporting and analysis data 107 about the clock structure and design that has been created that is of use to the designer, and/or verification of existing timing constraints 108.

Figure 1B:
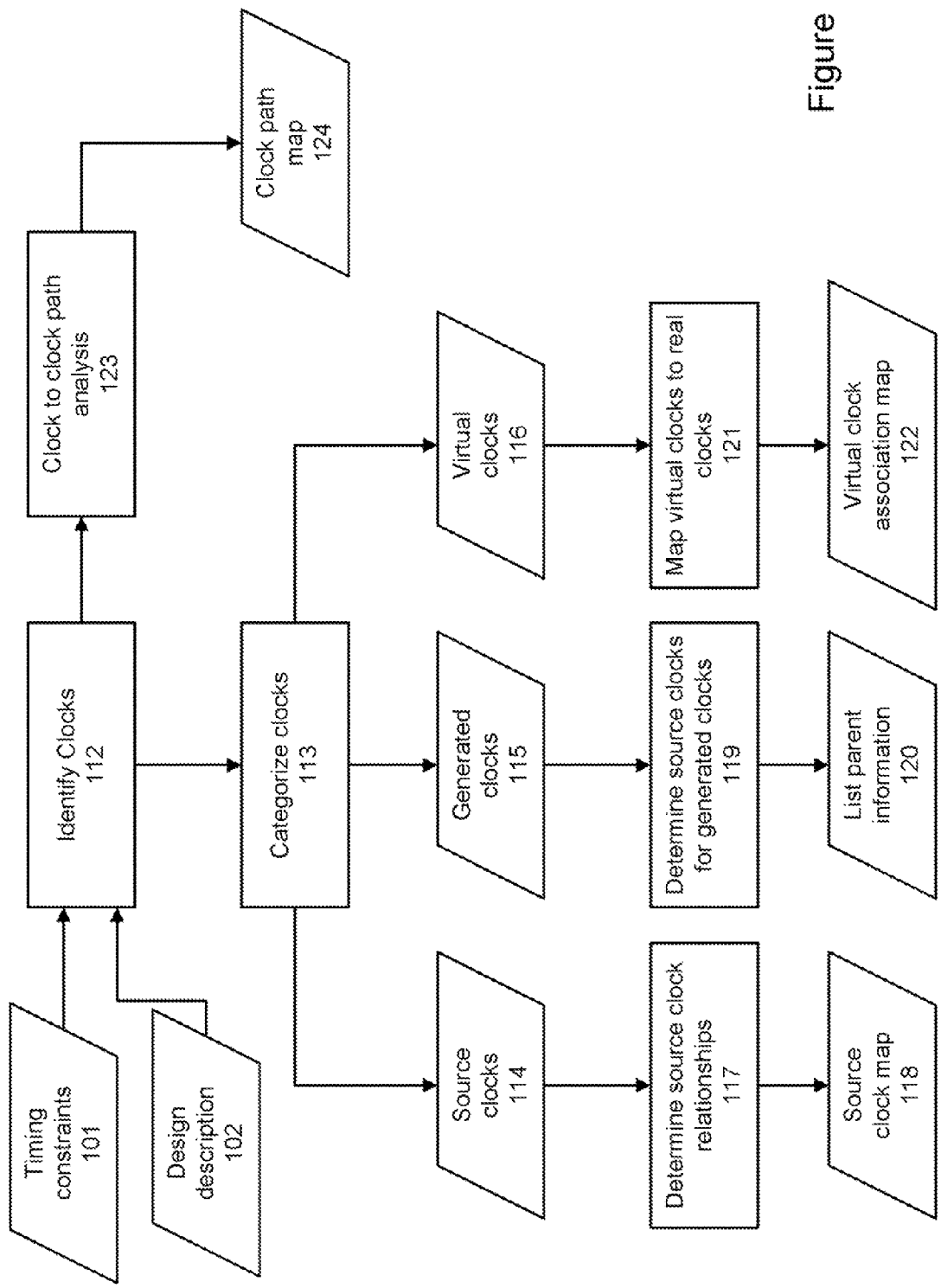
FIG. 1B is a simplified flow chart of some of the processing performed in an embodiment of a clock management method as described herein.

FIG. 1B shows a simplified flow chart of some of the processing ° performed in an embodiment of a clock management method as described herein. The timing constraint specification 101 and design description 102 are again shown as inputs. At step 112 a processor, such as processor 104 of FIG. 1A, identifies the clocks in the design from the clock definitions contained in the timing constraint specification 101. At step 113, the clocks are categorized as either "source" clocks (which do not depend on other clock waveforms) 114 or "generated" clocks (which depend on other clock waveforms) 115. Optionally, a category may also exist for "virtual" clocks 116, which are associated with real source or generated clocks, but themselves have no application point in the design, and are sometimes used by designers to determine how the design will function with some external circuit or device. It is well known to those of skill in the art how to determine which clocks are source, and which are generated, and in fact is often embedded in the timing constraint file by virtue of "create clock" commands. Those of skill in the art using virtual clocks will also appreciate how it is determined whether a clock is in fact a virtual one.

Figure 2:
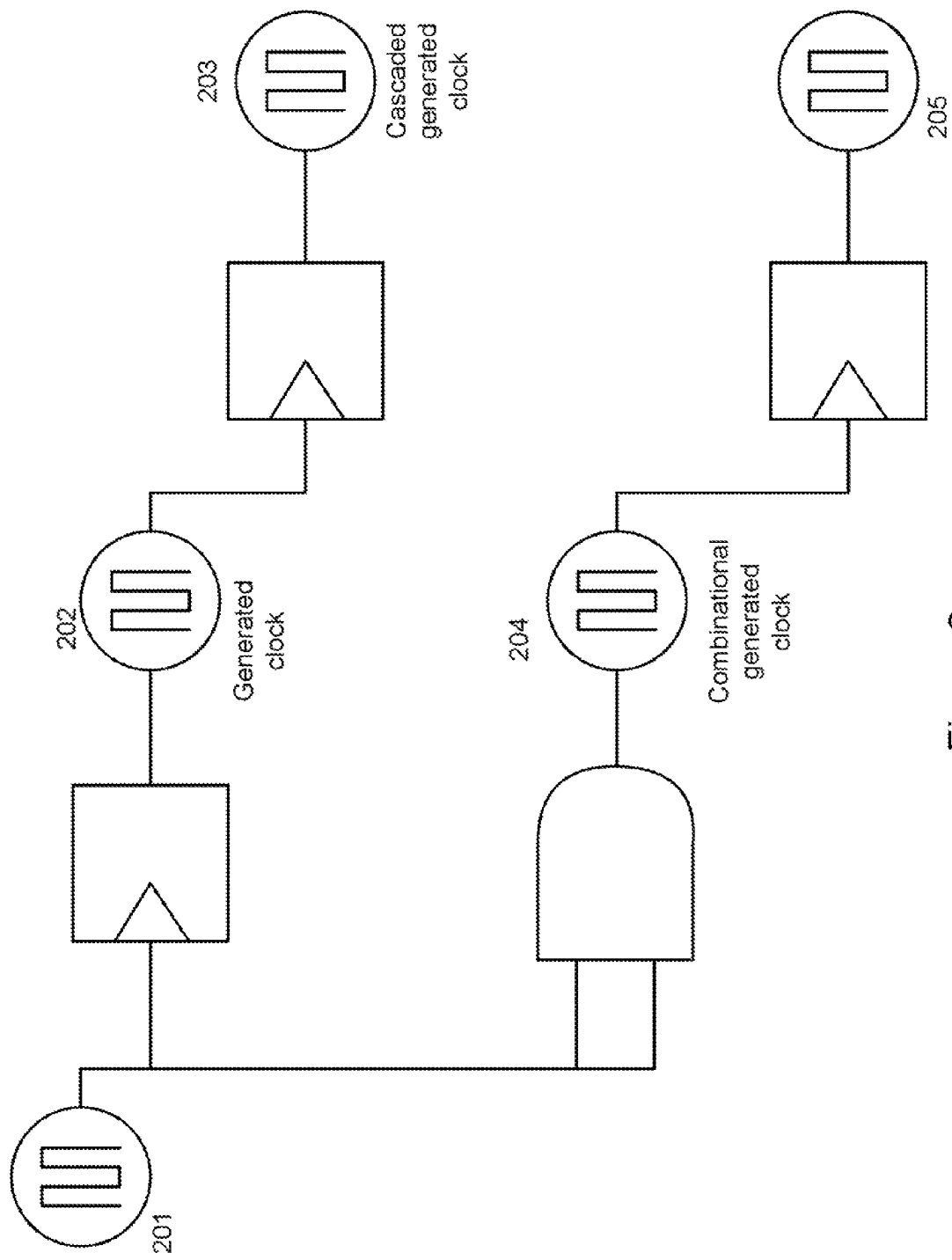
FIG. 2 shows the differences between source clocks and generated clocks in various embodiments.

FIG. 2 shows the differences between source clocks (also called "create" clocks), and generated clocks (also called "child" clocks). A generated clock always has another clock as a "parent" (either a source clock or another generated clock) from which it is derived, and the waveform and frequency of the generated clock is described as a function of the parent clock's characteristics. Thus, source clock 201 is the direct parent of generated clocks 202 and 204, and the ultimate parent of generated clocks 203 and 205. Clock 202 is the parent of clock 203, and clock 204 is the parent of clock 205, even though clocks 202 and 204 are themselves generated from clock 201.

Referring back to FIG. 13, in step 117, the processor determines the "baseline" relationships between the source clocks are determined, resulting in a report or "map" 118 showing any associations between the source clocks. These baseline relationships may depend upon definitions determined by the designer. For example, in one embodiment all source clocks may be assumed to be asynchronous with respect to one another, while in an alternative embodiment source clocks having a common frequency multiplier may be determined to be synchronous with respect to one another, and asynchronous otherwise. One of skill in the art will recognize other, similar, methods by which this baseline relationship may be determined in advantageous ways, but nonetheless remain within the scope of the invention.

The processor next analyzes the generated clocks 115 step 119 to determine their definitions, i.e., the chain of clocks leading from a source clock to a respective generated clock. This results in a list of the parent information of generated clocks 120 indicating the source clock that is the ultimate parent of a given generated clock.

If virtual clocks are included, in step 121, the processor maps the virtual clocks to their respective real clocks, whether source or generated, and creates an association map 122 showing the relationship between each virtual clock and a real clock.

At step 123 the processor typically also performs a clock-to-clock path analysis, which similarly results in a report or "map" 124 showing the paths between any given pair of clocks.

FIGS. 3A through 3D show the way in which the clock pair relationship database is created from the clock definitions in the provided timing constraint specification 101 in one embodiment of a clock management system.

Figure 3A:
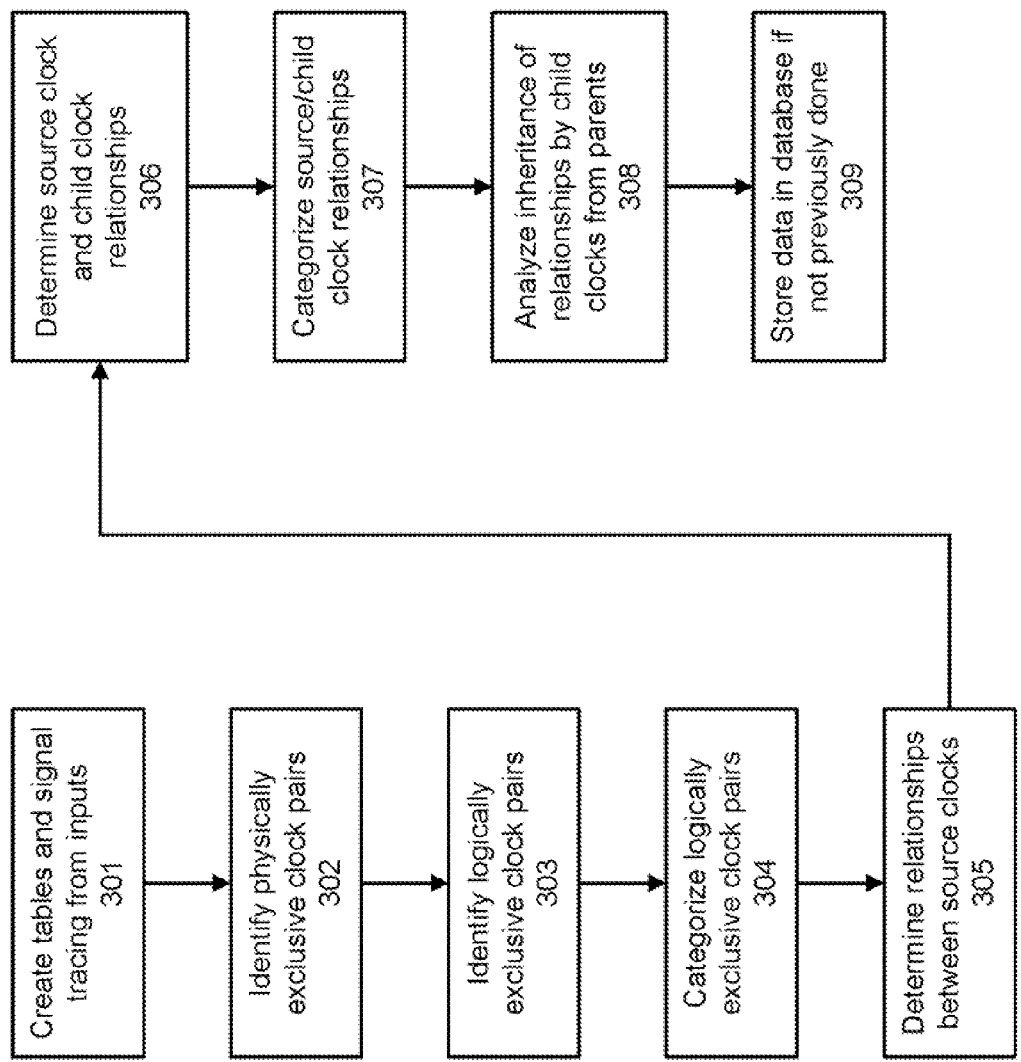
FIG. 3A is a flow chart of the interclock behavioral analysis as performed in one embodiment.

FIG. 3A is a more detailed flow chart of the interclock behavioral analysis performed by a processor such as processor 104 of FIG. 1, according to one embodiment.

In step 301, certain data is collected from the inputs and the processor creates certain items from the received data. First, the processor creates a table of "clock location points." This table lists the locations in the design and, for each location, the clocks applied at that location. In addition, the processor "traces" the clock signals are through the design to create a circuit description that is "annotated" with the clock signals; this tracing procedure is well known in the art. The processor also creates a "clock reach" table, listing the elements in the design that are reached by each clock signal.

Figure 4:
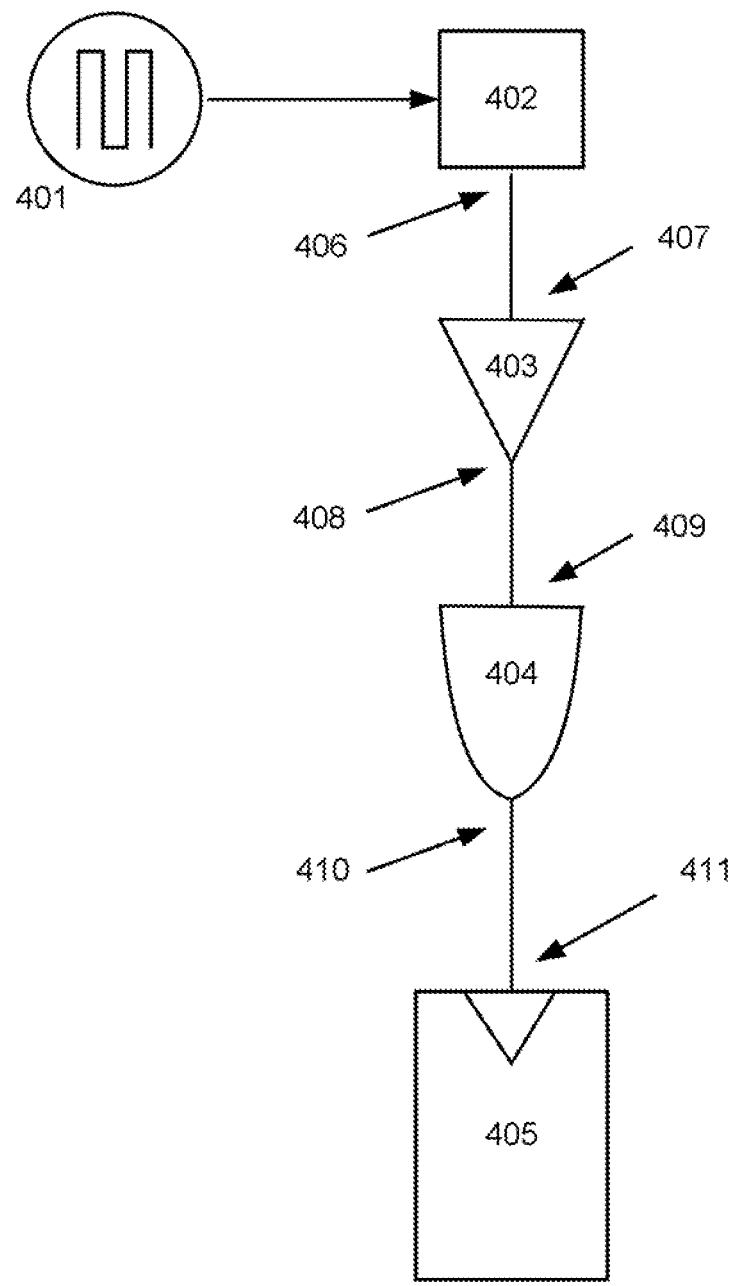
FIG. 4 shows the tracing of a clock signal through a path in a design to create circuit annotations, according to an embodiment.

FIG. 4 shows an example of how a clock signal might be traced through the design and the circuit annotated with the clock signal. In this example, a design contains a clock 401, a port 402, gates 403 and 404, and flip flop 405. Clock 401 generates a clock signal TT which is applied to port 402. The logical path of clock signal TT is followed as it propagates through gates 403 and 404 to flip-flop 405, where propagation stops. All intermediate points are annotated, or "tagged," as having clock signal TT propagating through them. Thus, port output 406, gate inputs 407 and 409, gate outputs 408 and 410, and flip-flop input 411 are all tagged with clock signal TT. This process is repeated for all clock signals in the design. As the trace of each signal reaches each point through which the signal passes, it is noted whether there is already a tag on that point, as will be explained further below. From this trace, a table of "clock location points" is created listing points in the circuit and the clock signals applied at those points.

Returning to FIG. 3A, at step 302, by comparing the clocks applied at each point in the design, as shown by the table of clock location points, the processor locates any physically exclusive clocks, i.e., clocks which are applied to the same physical point in the design at the same time. These clocks are placed into a group, and the clock pairs within this group are categorized as "physically exclusive."

For example, a table of clock location points might include the following entries:

| Location | Clocks applied |
|---|---|
| Pin XX | Clock 1 |
| Port YY | Clock 2, Clock 3 |
| Port ZZ | Clock 4, Clock 5, Clock 6 |

It can be seen that the clock pair of clock 2 and clock 3 meet the definition of physically exclusive, as both clocks are applied to port YY. Similarly, the clock pairs of clock 4/clock 5, clock 5/clock 6, and clock 4/clock 6 are all also physically exclusive, since all three of those clocks are applied to port ZZ. As above, such physically exclusive clocks should not be present in a proper design, and this group may thus be reported to a designer for consideration of changes to the design.

At step 303, the processor identifies any clocks which logically merge with another clock as logically exclusive. As above, clocks are considered to logically merge if they can be applied to the same point in the design, but only at different times, and are thus not physically exclusive.

Figure 5:
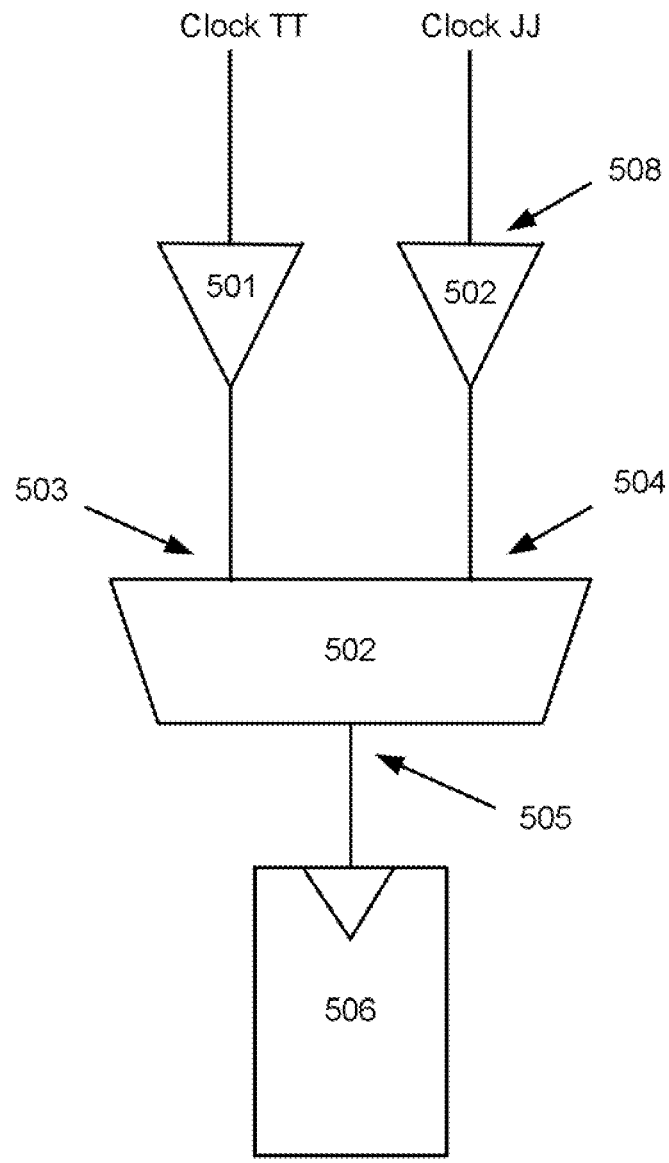
FIG. 5 illustrates how logically exclusive clocks may be identified by the use of the circuit annotations, according to an embodiment.

FIG. 5 illustrates a portion of a design with an example of logically exclusive clocks and how they may be identified by the use of the circuit annotations described above with respect to step 301 and FIG. 4. A clock signal TT propagates through a gate 501, to a multiplexor 502 having inputs 503 and 504 and an output 505, and ends at flip-flop 506. When clock signal TT is traced as described above, the processor will update the table of clock location points to indicate the presence of clock signal TT at the input 503 and output 505 of multiplexor 502 (as well as other points) as described above.

Next, another clock signal JJ is traced by the processor, which propagates through gate 507 to input 504 of multiplexor 502. The processor will similarly update the table of clock location points to indicate the presence of clock signal JJ at input 508 and output 509 of gate 507, and input 504 and output 505 of multiplexor 502.

When the trace reaches output 505 of multiplexor 502, when the processor updates the table of clock location points, it will find that there is already a tag at that point, for clock signal TT, whereas the prior point tagged with clock signal JJ, input 504 of multiplexor 502, did not have a tag for clock signal TT. In such a case, i.e., where a particular trace (here clock signal JJ) reaches a point where another tag is already present while the prior point of the trace in progress did not have the other tag on it, the processor determines that the two clock signals have logically merged. (The output 505 of multiplexor 502 and the input of flip-flop 506 will also be tagged with clock signal JJ as above.)

Each clock signal TT and JJ arrives at a different port of multiplexor 502, which will select one signal or the other, and subsequently propagate only the selected waveform to the flip-flop 506. Thus, the two clocks TT and JJ are not physically exclusive, since they are not applied to the same point in the design at the same time, but are logically exclusive since each can be applied to flip-flop 506 but only at different times. However, as above, while logically exclusive clocks are permitted, it is useful to identify such instances where clocks logically merge for consideration by a designer.

Returning to FIG. 3A, all clocks that are determined by the processor to be logically merged in step 303 are further analyzed and categorized at step 304, as will be explained in more detail below.

At Step 305, the baseline relationship between the source clocks is determined by the processor, as previously explained with respect to step 118 of FIG. 1B. Again, the baseline relationships may depend upon definitions determined by the designer, e.g., all source clocks may be assumed to be asynchronous with respect to one another, source clocks having a common frequency multiplier may be determined to be synchronous with respect to one another and asynchronous otherwise, etc.

At step 306, the relationship between a source clock and its generated "child" clocks is established, as in step 115 of FIG. 1B. These relationships are further analyzed and categorized by the processor in step 307, as will be explained in more detail below.

At step 308, the processor determines that generated clocks "inherit" the relationships of the source or parent clocks from which they are derived. These inherited relationships are used to establish the relationship of any clock to all other clocks in the design that have not yet been determined, and are further analyzed as explained further below.

At the conclusion of step 308, the relationships between the clock pairs in the design have been determined, and the database listing the clock pairs and their relationships is stored by the processor at step 309. (Typically data will be written upon the completion of each of the steps described above, for later use during other steps as described herein.)

Figure 3B:
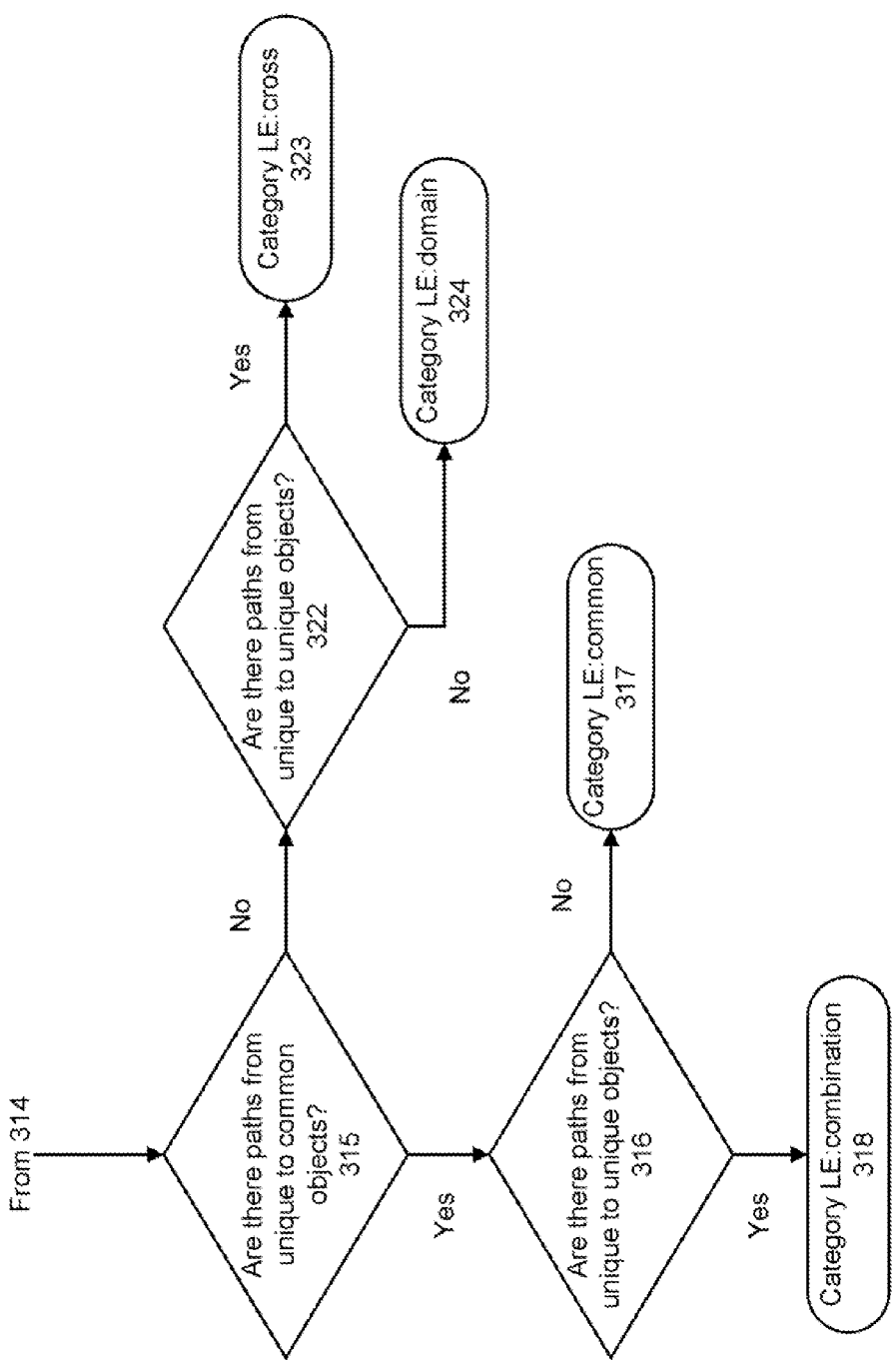
FIG. 3B is a flow chart of a method of classifying logically exclusive clock pairs, according to one embodiment.

In addition to identifying clocks that are logically exclusive, it is often useful to designers to be able to more precisely identify the relationship between any two logically exclusive clocks. FIG. 3B is a flow chart of a method of further classifying the logically exclusive clock pairs as in step 305 of FIG. 3A, according to one embodiment.

First, at step 311, a clock pair which was determined to be logically exclusive at step 303 of FIG. 3A is retrieved by the processor from the database. At step 312, the "common" objects of each clock in the pair, i.e., all flip-flop elements and ports in the design that are "clocked" by both clocks in the pair, are identified by the processor.

At step 313, the processor determines whether the clocks in the pair reach any "unique" objects, i.e., objects driven by only one of the clocks in the pair.

If either clock reaches unique objects, the method proceeds down one path, starting with step 314 where it is determined whether both clocks in the pair reach unique objects.

If both clocks in the pair reach unique objects, at step 315 the processor determines whether any of the "common" objects identified in step 312 have logical timing paths to the "unique" objects identified in step 313.

At step 316, the processor determines whether logical timing paths exist between the unique sets of objects driven by each clock in the clock pair under consideration. If there are no such logical timing paths between the unique sets of objects driven by each clock pair, at step 317 the clock pair is designated as "LE:common," reflecting that the clocks are logically exclusive and there are paths from unique to common objects (as determined in step 315), but not from the unique objects of one clock to the unique objects of the other clock.

If there are such logical timing paths between the unique sets of objects driven by each clock pair, then at step 318 the clock pair is designated as "LE:combination" reflecting that both clocks reach unique objects (as in step 314), and that there are paths from both unique to common objects (step 315) and paths between the unique objects of each clock (step 316).

If the processor determines at step 315 that there are no logical paths from common to unique objects, at step 322 it next determines whether there are logical paths between the unique objects of one clock and those of the other clock (as in step 316). If there are such paths between the unique objects, the clock pair is designated as "LE:cross" at step 323, reflecting that there are paths between the unique objects of the respective clocks, but not between any unique and common objects. If at step 322 the processor determines that there are no logical paths between the unique objects, and no logical paths between unique and common objects (as determined at step 315), the clock pair is designated as "LE:domain" at step 324.

If the processor determines at step 314 that only one clock in the pair reaches unique objects, then at step 319, it then determines (as in step 315) whether any of the common objects identified in step 312 have logical timing paths to the unique objects identified in step 313. If there are logical paths between the common objects and the unique objects, at step 320 the clock pair is designated as "LE:common" (as in step 318), again reflecting that there are paths from unique to common objects.

If at step 319 the processor determines that there are no logical paths between the common and unique objects, then the clock pair is designated as "LE:domain" at step 312, again reflecting no logical paths between common and unique objects, or unique objects of one clock and unique objects of the other clock. (There can be no logical paths between unique objects, since it has been determined at step 314 that only one clock has unique objects.)

If at step 313 the processor determines that there are no unique objects reached by either clock, then at step 325 a determination is made whether there are logical paths between objects in the "common" object list, i.e., the elements that are clocked by both clocks. If there are logical paths between common objects, the clock pair is designated as "LE:pure" at step 326, while if there are no logical paths between common objects the clock pair is designated as "LE: floating" at step 327.

This process is repeated for the various logically exclusive clock pairs determined in step 303 of FIG. 3A, and the analysis of the logically exclusive clock pairs in steps 311. to 327 of FIG. 3B completes step 304 of FIG. 3A. A logically exclusive clock pair will thus be designated not just as logically exclusive, but as "LE:(xxx)," where "(xxx)" is one of the subcategories recited above, i.e., domain, cross, common, combination, pure or floating. This information is stored in the clock pair relationship database as part of step 309, for example, in memory 105 in FIG. 1A.

In some embodiments, the determination of whether there are paths between common and unique objects, as set forth in steps 312, 313, 314, 315, 316, 319, 322 or 325 above, may be made using mathematical set operations as follows. In one example, the clock reach table might include the following entries indicating flip-flops reached by two clocks:

| Clock | Objects reached |
|---|---|
| Clock 1 | FF0, FF1 |
| Clock 2 | FF0, FF2 |

From this table, the processor may define various sets. The objects reached by clock 1 form a set "Objects 1," and the objects reached by clock 2 form a set "Objects 2." To determine common objects ("Objects C") in step 312, the processor finds the "set intersection" of the objects reached by each clock in the clock pair, i.e., the intersection of the sets Objects 1 and Objects 2. Here, for example, the intersection of the set of objects reached by each clock is flip-flop FF0.

Once the processor has determined the common objects of two clocks, it finds the unique objects for each clock by taking the set of objects reached by the clock with the common objects removed. Thus, taking the objects reached by clock 1 and removing common object FF0 leaves flip-flop FF1 as the unique object for clock 1. Similarly, flip-flop FF2 is the unique object for clock 2.

Figure 6:
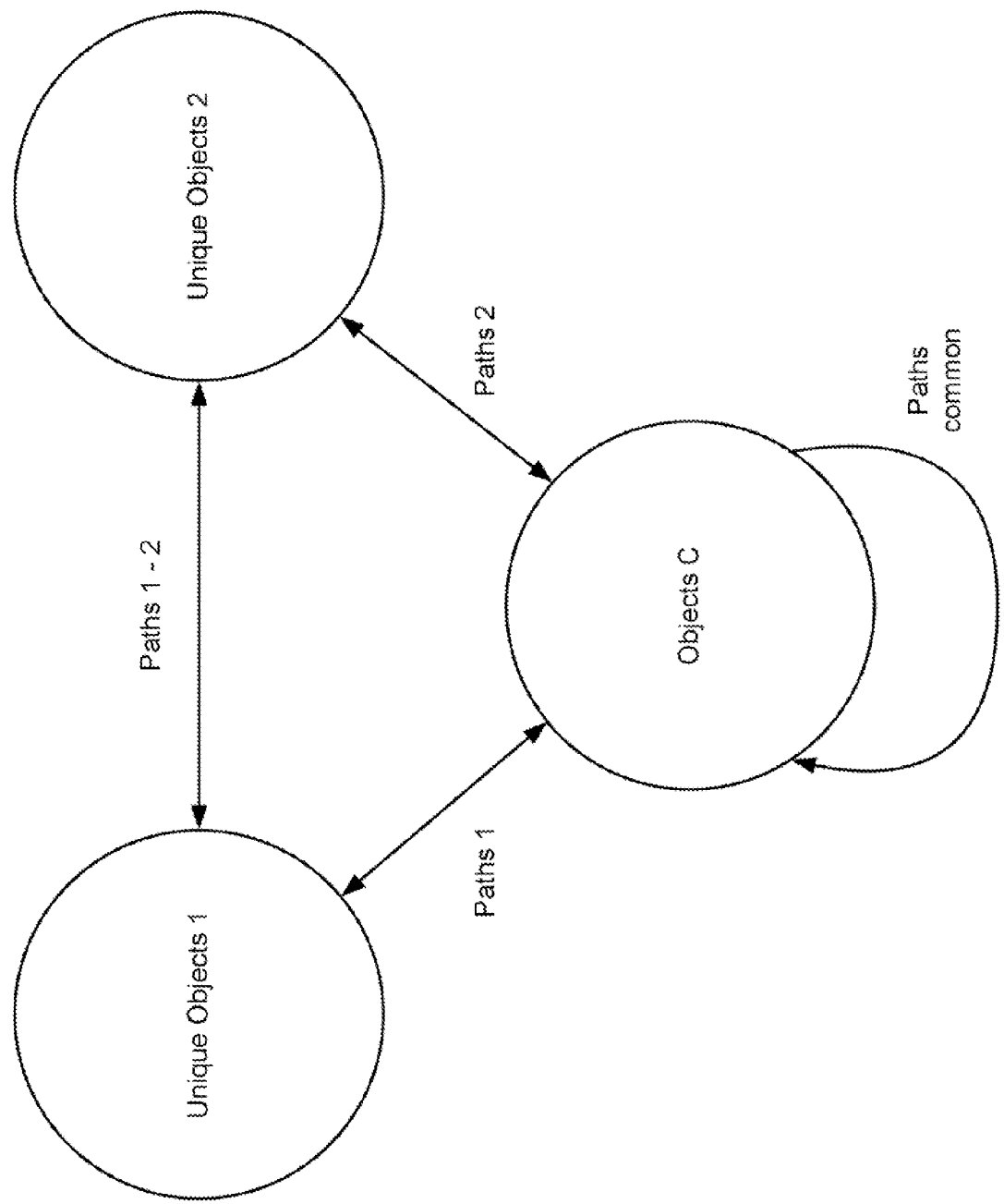
FIG. 6 illustrates the possible use of sets in determining the relationships between logically exclusive clocks in one embodiment.

The use of sets also allows the other determinations in the steps indicated in FIG. 3B to be made by the processor by determining the associations between the common and unique objects. FIG. 6 shows that three sets of objects reached by the clock 1/clock 2 pair are defined as explained above: common objects ("Objects C"), unique objects of clock 1 ("Unique Objects 1"), and unique objects of clock 2 ("Unique Objects 2"). The sets are determined as above.

Paths between the objects in the sets may be retrieved by the processor from the circuit description that was annotated with traced clock signals as described above. As shown in FIG. 6, paths between the common objects of clocks 1 and 2 and the unique objects of clock 1 are designated as "Paths 1." Similarly, paths between the common objects and the unique objects of clock 2 are designated as "Paths 2." Paths between the unique objects of each clock are designated as "Paths 1-2," while paths between common objects are designated as "Paths Common."

Thus, once the sets are defined, common objects may, for example, be identified by the processor in step 312 by taking the contents of set Objects C. Whether there are any unique objects is determined at step 313 by determining whether one or more objects are present in either set Unique Objects 1 or set Unique Objects 2. Whether both clocks reach unique objects is determined by the processor at step 314 by determining whether there are objects present in both set Unique Objects 1 and set Unique Objects 2.

Similarly, at steps 315 and 319, whether there are paths from unique to common objects is determined by finding any paths in either Paths 1 or Paths 2. At steps 316 and 322, whether there are any paths between unique objects is determined by considering whether there are any paths in Paths 1-2. And at step 325, whether there are paths between common objects is determined by whether there are any paths in Paths Common.

Figure 3C:
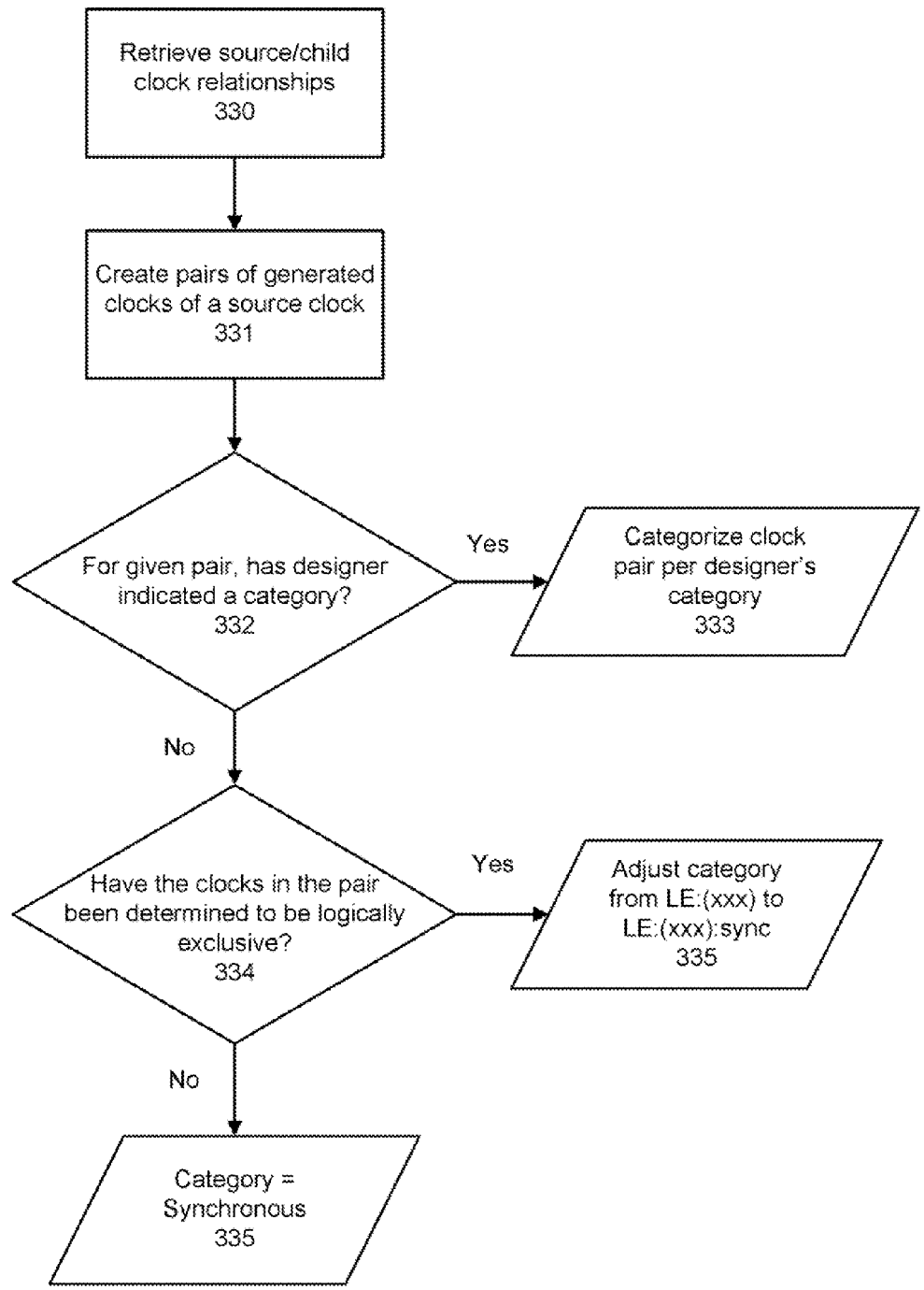
FIG. 3C is a more detailed flow chart of the step of categorizing the relationship between a source clock and all its generated "child" clocks, according to one embodiment.

FIG. 3C is a more detailed flow chart of the step of categorizing the relationship between a source clock and all its generated "child" clocks as in step 307 of FIG. 3A, according to one embodiment.

First, at step 330, a list of the relationships between source clocks and child clocks that were located in step 306 of FIG. 3A is retrieved by the processor. At step 331, the processor compares child clocks that are generated from an identified source clock to the other child clocks generated from the same source clock, thus creating a number of clock pairs.

At step 332, for each of the clock pairs defined at step 331 the processor determines whether the designer has indicated the category of the clock pair. If so, then the clock pair is categorized as indicated by the designer.

If there is no indicated category, at step 334, the processor next determines whether a relationship for the clock pair under consideration has already been determined by the process of FIG. 3B, i.e., the clock pair is logically exclusive and has already been categorized as such. If there is already a relationship between the two clocks, then it will be of the form "LE:(xxx)" as above. At step 335, the processor will change this to "LE:(xxx):sync," to indicate that the two clocks are both logically exclusive and synchronously related.

If there is no logically exclusive designation, then at step 336 the clock pair is marked with the category "synchronous." The process of FIG. 3C is repeated for the various source clocks retrieved, and the generated child clocks of each source clock.

Figure 3D:
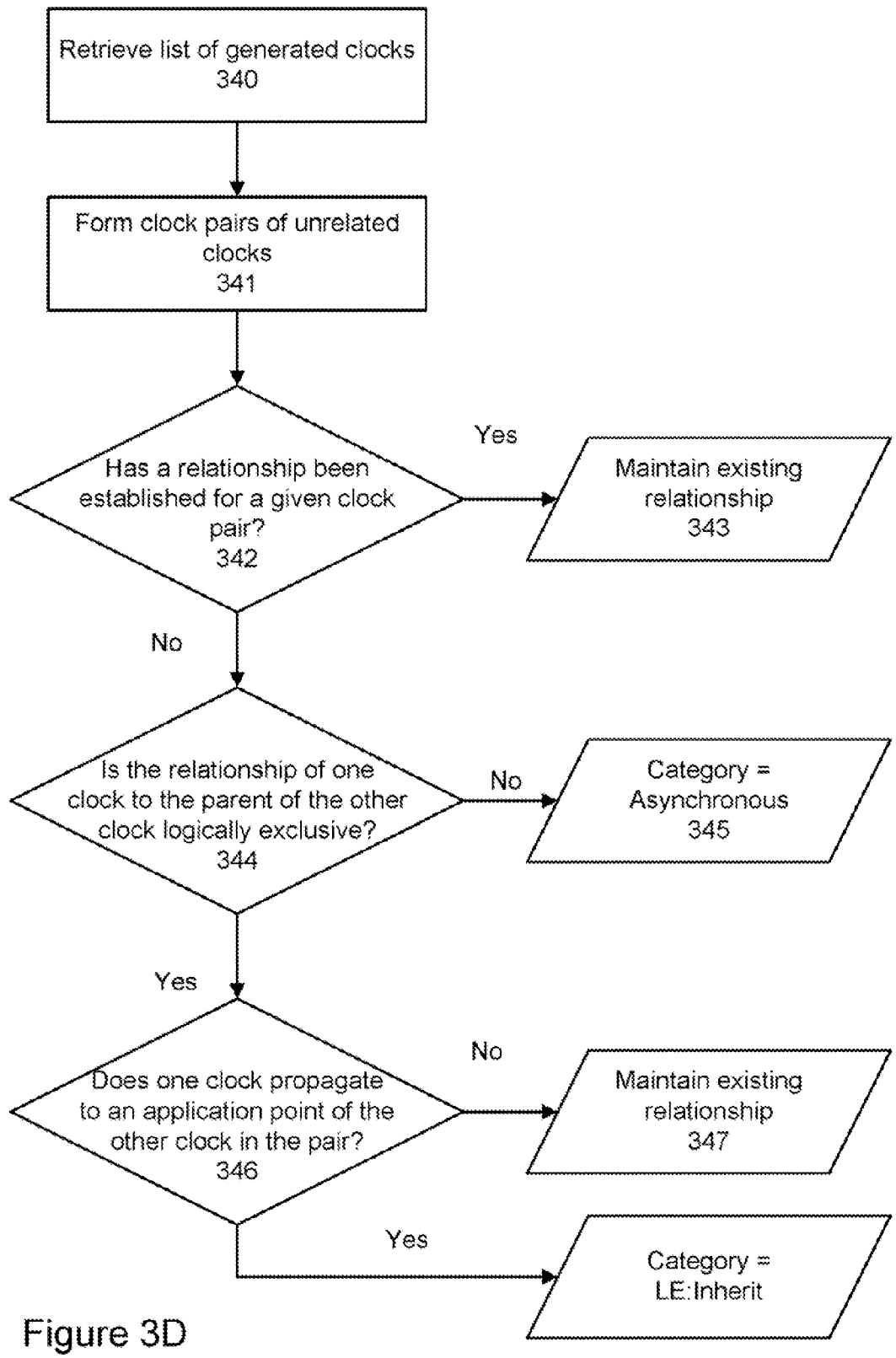
FIG. 3D is a flow chart of a method of further classifying the relationship of parent/child clocks with respect to other clocks in the design, according to one embodiment.

FIG. 3D is a flow chart of a method of further classifying the relationship of parent/child clocks with respect to the other clocks in the design, as in step 308 of FIG. 3A, according to one embodiment. Again, generated clocks are deemed to "inherit" the relationships of the source or parent clocks from which they are derived.

In step 340, the processor retrieves a list of the generated clocks in the design, along with the information regarding their parent clocks. Again, a parent clock can be a source clock or another generated clock.

At step 341, the processor forms clock pairs between generated clocks and unrelated clocks, i.e., a generated clock forms a clock pair with any of the other clocks that are not in its "related" tree, i.e., that is not one of its parent or children clocks. (The related clocks were treated in the process of FIG. 3C above.)

For a clock pair of a generated clock "clk-X" and another unrelated clock "clk-Y," at step 342 the processor checks to see whether a relationship between clk-X and clk-Y has already been determined from either the process of FIG. 3A or the process of FIG. 3B, i.e., whether the clock pair has already been determined to be physically exclusive or logically exclusive. If the clock pair has been determined to be physically exclusive or logically exclusive, then the designation of that relationship is maintained at step 343.

If there is no prior determination of a relationship between clk-X and clk-Y, then at step 344 the relationship between clk-Y and the parent clock of clk-X is examined. If this clock pair is not logically exclusive, then at step 345 the relationship between the two clocks is determined to be asynchronous.

If clk-Y and the parent clock of clk-X are logically exclusive, then at step 346, the processor determines whether clk-Y propagates to the application point of clk-X. If clk-Y does not propagate to the application point of clk-X, then at step 347 the default relationship between the clocks as identified at step 306 is maintained.

If clk-Y does propagate to the application point of clk-X, then at step 348 the clock pair is put into a category "LE: inherit."

The processor repeats the steps of FIG. 3D for the various generated clocks that were retrieved, and the clock pairs formed between them.

At the conclusion of this process, starting with step 301 and concluding with step 309 of FIG. 3A, and including the more detailed analysis shown in FIGS. 3B, 3C and 3D, the relationships between clock pairs in the design have been determined by the processor, and can be used as outputs of the reporting and analysis functions shown in step 107 of FIG. 1A. This information is of great value to designers, information determined is not available by other means, and is critical to reaching a full understanding of the design function.

One of skill in the art will appreciate that while some of the relationships determined by the method described herein are clearly synchronous and other clearly asynchronous, in some cases skilled designers may differ on whether two clocks are synchronous or asynchronous. In one embodiment, a clock pair will be considered synchronous or asynchronous as follows:

| Determined category | Default value |
| --- | --- |
| synchronous | synchronous |
| asynchronous | asynchronous |
| physically exclusive | asynchronous |
| LE: pure | asynchronous |
| LE: domain | asynchronous |
| LE: common | asynchronous |
| LE: cross | asynchronous |
| LE: combination | asynchronous |
| LE: inherit | asynchronous |
| LE: pure: sync | asynchronous |
| LE: domain: sync | asynchronous |
| LE: common: sync | synchronous |
| LE: cross: sync | synchronous |
| LE: combination: sync | synchronous |

In some embodiments, a designer may be permitted to override certain of these designations, and consider clocks asynchronous rather than synchronous or vice versa. One of skill in the art will appreciate situations in which it may be beneficial to do so.

Although not explicitly stated above, it will typically be advantageous to have the processor analyze the relationships of all possible clock pairs in a design, as this may uncover problems that may not be otherwise discovered, and will provide more information to a designer about the potential timing performance of the design. However, this is not required to make use of the described method.

Figure 7:
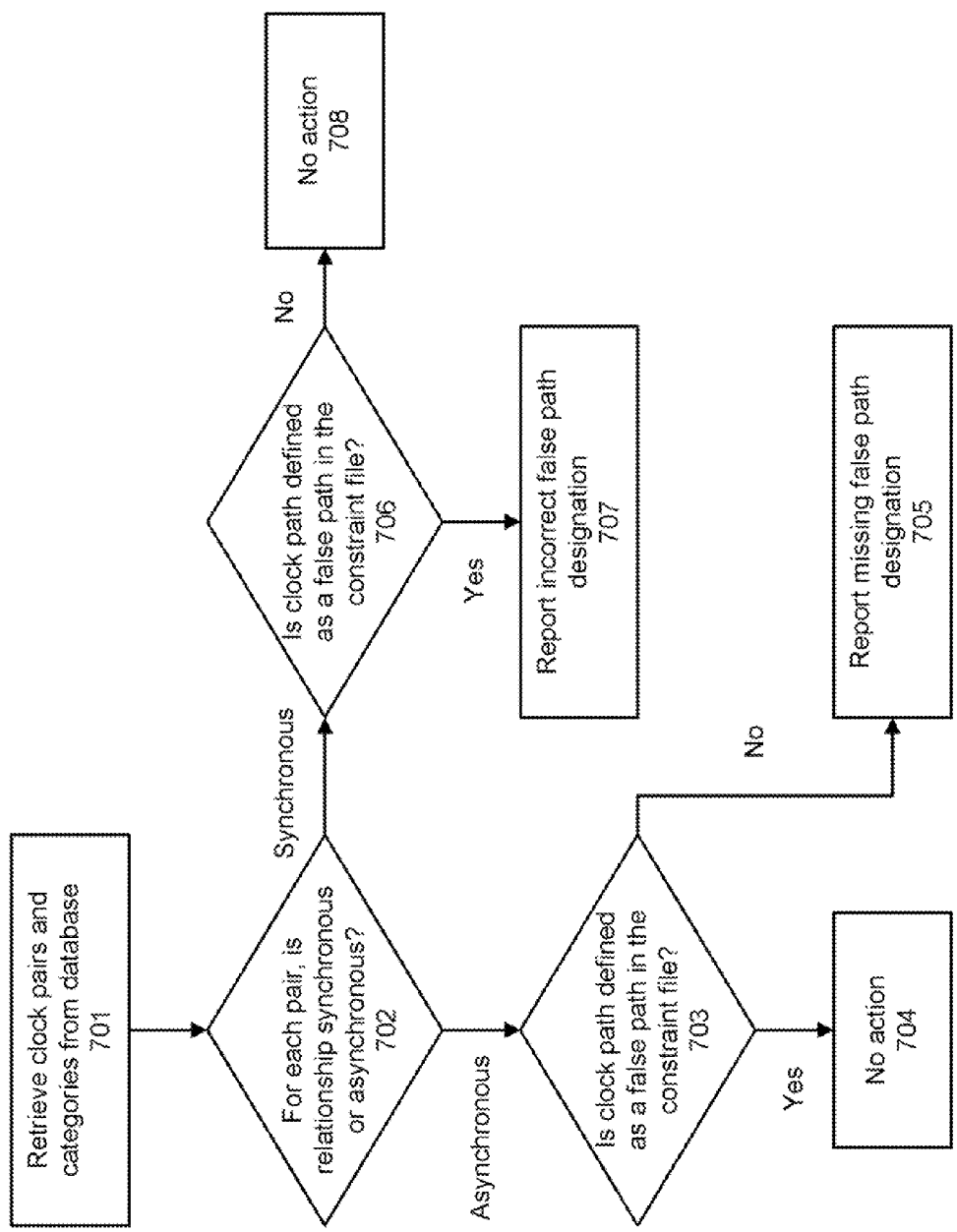
FIG. 7 is a flow chart of a method of using a clock pair database to verify timing exceptions contained in a timing constraint file provided as input, according to one embodiment.

FIG. 7 shows one possible use of the method of determining the relationships of clock pairs described above and the clock pair relationship database created thereby for verifying existing timing exceptions in the timing constraint file provided as input to the process, according to one embodiment.

At step 701, the clock pairs in the design and the data regarding the relationships between the clocks in the clock pairs are retrieved by the processor from the clock pair database, which has been previously created as described above.

At step 702, for each of the identified clock pairs the processor determines whether the relationship category retrieved from the database indicates either a synchronous or asynchronous relationship. For example, in one embodiment, the fact that a clock pair has been determined to be logically exclusive of some type (i.e., LE:(xxx)) or physically exclusive may indicate an asynchronous clock relationship between the pair. As above, some clock pairs may have already been determined to be synchronous or asynchronous.

If an asynchronous clock pair is indicated, at step 703 the processor determines whether the timing constraint file indicates that a "false-path" exception has been created between the clock pair.

If a false-path exception is indicated for the asynchronous clock pair, then no action is necessary, and at step 704 the processor simply returns the process to step 702 (not shown) to consider the next clock pair. However, if the timing constraint file does not contain a false-path exception being considered, then at step 705 the processor reports the clock pair as having a "missing" false path in the timing constraint file.

If the processor determines the clock pair under consideration to be synchronous, then at step 706 the same determination of step 703 is made, i.e., whether the timing constraint file indicates that a false-path exception has been created between the clock pair.

Now, however, the actions taken based upon the results of this determination are reversed. If the timing constraint file contains a false-path exception for a synchronous clock pair, then the processor reports the clock pair as having an "incorrect" false path in the constraint file at step 707. If the timing constraint file does not contain a false-path exception for the synchronous clock pair, then no action is necessary and at step 708 the processor again returns to step 702 to consider the next clock pair.

It will be apparent to one of skill in the art that one possible extension to the method of FIG. 7 is to have the process write a timing exception for an asynchronous clock pair rather than merely verify it, thus implementing the output shown in Step 106 of FIG. 1A.

The value of the reports generated by the methods disclosed herein, and other possible uses of the data and reports created thereby, will be apparent to those of skill in the art. For example, the database may be used to drive CDC (clock domain crossing) analysis, or to drive clock and mode discovery on designs.)

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that different file formats may be used for the timing constraint specification and design description, and that different types of output reports may be created from the clock pair database that is generated by the methods described herein.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A computer-implemented method for identifying and managing the relationships between clock domains in an integrated circuit design, comprising:
    receiving at a computer system as inputs a description of the design, and definitions of clock waveforms and timing constraints used in the design; and
    in the computer system, automatically identifying pairs of clocks from the timing constraints and, for each identified pair of clocks:
        in the computer system, categorizing each clock in the pair as a source clock or a generated clock and, if the clock is a generated clock, its parent clock;
        in the computer system, identifying any points in the design at which the clocks in the pair of clocks are applied simultaneously;
        in the computer system, identifying any points in the design at which the clocks in the pair of clocks logically merge;
        in the computer system, if the clocks in the pair of clocks are both source clocks, determining the default relationship between the clocks;
        in the computer system, if either clock in the pair of clocks is a generated clock, determining the relationship between the generated clock and the source clock from which the generated clock is derived;
        in the computer system, if either clock in the pair of clocks is a generated clock, determining whether the generated clock inherits any relationship from its parent clock; and
        in the computer system, assigning the clock pair to one of a plurality of behavioral categories based upon one of the determined relationships.

2. The computer-implemented method of claim 1 wherein identifying the relationships between all of the clocks further comprises identifying each possible pair of clocks and categorizing the relationship of each such clock pair.

3. The computer-implemented method of claim 1 wherein identifying any points in the design at which a plurality of clock definitions logically merge further comprises determining in the computer system:
    whether there are common objects reached by signals from both clocks;
    whether there are unique objects reached by signals from one clock or the other; and
    whether there are circuit paths between common objects, between common objects and the unique objects of either clock, and/or between the unique objects of one clock and the unique objects of the other clock.

4. The computer-implemented method of claim 1 wherein determining the relationships between source clocks further comprises assuming that all source clocks are asynchronous to one another.

5. The computer-implemented method of claim 1 wherein determining the relationships between source clocks further comprises assuming that all source clocks with a common frequency are synchronous to one another.

6. The computer-implemented method of claim 5 wherein determining the relationships between source clocks further comprises assuming that all source clocks that do not have a common frequency are asynchronous to one another.

7. The computer-implemented method of claim 1 wherein determining the relationships between source clocks and generated clocks further comprises assuming that a generated clock is synchronous to a source clocks from which it is derived unless the design description specifies that they are asynchronous or the generated clock logically merges with the source clock.

8. The computer implemented method of claim 1, further comprising receiving in the computer system as an input a list of timing exceptions.

9. The computer implemented method of claim 1, further comprising verifying in the computer system any timing exceptions between the clocks specified in the description, based on the behavioral category in which each clock is categorized.

10. The computer implemented method of claim 1, further comprising creating in the computer system any missing timing exceptions between the clocks specified in the description, based on the behavioral category in which each clock is categorized.

11. The computer-implemented method of claim 1 wherein the description of the design is in a synthesizable format.

12. The computer-implemented method of claim 1 wherein the description of the design is in synthesizable RTL-level format.

13. The computer-implemented method of claim 1 wherein the description of design is a synthesized gate-level netlist.

14. The computer-implemented method of claim 1 wherein the definitions of clock waveforms and timing constraints are in SDC format.

15. A system for identifying and managing the relationships between clock domains in an integrated circuit design, comprising:
    input means receiving a description of the design, and definitions of all clock waveforms and timing constraints used in the design; and
    a processor configured to automatically identify pairs of clocks from the timing constraints; and, for each identified pair of clocks:
        categorize each clock in the pair as a source clock or a generated clock and, if the clock is a generated clock, its parent clock;
        identify any points in the design at which the clocks in the pair of clocks are applied simultaneously;
        identify any points in the design at which the clocks in the pair of clocks logically merge;

if the clocks in the pair of clocks are both source clocks, determine the default relationship between the clocks;

if either clock in the pair of clocks is a generated clock, determine the relationship between the generated clock and the source clock from which the generated clock is derived;

if either clock in the pair of clocks is a generated clock, determine whether the generated clock inherits any relationship from its parent clock; and assign the clock pair to one of a plurality of behavioral categories based upon one of the determined relationships.

16. A non-transitory computer readable medium having embodied thereon a program, the program being executable by a processor to perform a method of identifying and managing the relationships between clock domains in an integrated circuit design, the method comprising the steps of:

receiving at a computer system as inputs a description of the design, and definitions of clock waveforms and timing constraints used in the design; and in the computer system, automatically identifying pairs of clocks from the timing constraints and, for each identified pair of clocks:

in the computer system, categorizing each clock in the pair as a source clock or a generated clock and, if the clock is a generated clock, its parent clock;

in the computer system, identifying any points in the design at which the clocks in the pair of clocks are applied simultaneously;

in the computer system, identifying any points in the design at which the clocks in the pair of clocks logically merge;

in the computer system, if the clocks in the pair of clocks are both source clocks, determining the default relationship between the clocks;

in the computer system, if either clock in the pair of clocks is a generated clock, determining the relationship between the generated clock and the source clock from which the generated clock is derived;

in the computer system, if either clock in the pair of clocks is a generated clock, determining whether the generated clock inherits any relationship from its parent clock; and in the computer system, assigning the clock pair to one of a plurality of behavioral categories based upon one of the determined relationships.

17. The method of claim 1, wherein categorizing each clock in the pair as a source clock or a generated clock, and, if the clock is a generated clock, its parent clock further comprises categorizing each clock in the pair as a source clock, a generated clock or a virtual clock, and further comprising:

in the computer system, if either clock, is a virtual clock, determining any relationship between the virtual clock and an associated source clock or generated clock in the integrated circuit design and storing the determined relationship of the virtual clock to an associated clock in a database.

18. The non-transitory computer readable medium of claim 16, wherein the step of categorizing each clock in the pair as a source clock or a generated clock, and, if the clock is a generated clock, its parent clock further comprises categorizing each clock in the pair as a source clock, a generated clock or a virtual clock, and the method further comprises the step of:

in the computer system, if either clock is a virtual clock, determining any relationship between the virtual clock and an associated source clock or generated clock in the integrated circuit design and storing the determined relationship of the virtual clock to an associated clock in a database.

19. The non-transitory computer readable medium of claim 16, wherein the method further comprises the steps of identifying any points in the design at which a plurality of clock definitions logically merge further comprises determining in the computer system:

whether there are common objects reached by signals from both clocks;

whether there are unique objects reached by signals from one clock or the other; and whether there are circuit paths between common objects, between common objects and the unique objects of either clock, and/or between the unique objects of one clock and the unique objects of the other clock.

20. The non-transitory computer readable medium of claim 16, wherein the method further comprises the step of creating in the computer system any missing timing exceptions between the clocks specified in the description, based on the behavioral category in which each clock is categorized.

* * * * *